United States Patent [19]
Larson

[11] Patent Number: 4,486,970
[45] Date of Patent: Dec. 11, 1984

[54] TROLLING DEPTH CONTROLLER

[76] Inventor: Wilfred Larson, 41244 Medway Ave., Quartz Hill, Calif. 93534

[21] Appl. No.: 719,287

[22] Filed: Aug. 31, 1976

[51] Int. Cl.³ ............................................... A01K 95/00
[52] U.S. Cl. ...................................................... 43/43.13
[58] Field of Search ............................. 43/43.13, 42.23

[56] References Cited

U.S. PATENT DOCUMENTS

| | | | |
|---|---|---|---|
| 2,726,475 | 12/1955 | Wiselka | 43/43.13 |
| 2,924,907 | 2/1960 | Hamilton | 43/43.13 |
| 2,997,804 | 8/1961 | Creason, Sr. et al. | 43/43.13 |
| 3,094,804 | 6/1963 | Walton et al. | 43/43.13 |
| 3,401,483 | 9/1968 | Bellah et al. | 43/43.13 |
| 3,543,431 | 12/1970 | Olds | 43/43.13 |
| 3,570,167 | 3/1971 | Smith | 43/43.13 |
| 4,028,839 | 6/1977 | Stubblefield | 43/43.13 |

FOREIGN PATENT DOCUMENTS

| | | | |
|---|---|---|---|
| 1344477 | 10/1963 | France | 43/43.13 |

*Primary Examiner*—Nicholas P. Godici
*Assistant Examiner*—P. Weston Musselman, Jr.
*Attorney, Agent, or Firm*—Edward D. O'Brian

[57] ABSTRACT

A trolling depth controller having a body with a generally delta wing pattern and an air-foil cross section, the primary camber being on the lower surface and the nose being weighted. An upper fin includes a plurality of holes along its rearwardly sloping leading edge for attachment of the towing line. A lower, rearwardly sloped fin also includes a plurality of holes, at least some of which are positioned along a trailing edge for attachment of the towed lure or bait line.

4 Claims, 5 Drawing Figures

TROLLING DEPTH CONTROLLER

BACKGROUND OF THE INVENTION

Fishing, both for pleasure and profit, consistently attracts extremely large numbers of participants. A complete industry has been built around this activity, dealing in lures, sinkers, depth finders and many related pieces of fishing tackle.

It has been found to be characteristic of fish that they often swim at particular depths, depending upon water temperature, the season of the year, and the types of fish involved. Even the time of the day sometimes has a bearing upon this depth-seeking tendency. Since the greatest success in troll fishing is experienced when the bait or lure can be maintained at that depth wherein the fish reside at any particular time, it is desirable that means be provided whereby such depth control can be consistently obtained. Several devices have been marketed with the intent of providing control of this nature, but each has been found to be deficient in certain particulars which detract from its controllability. More specifically, no device has been available which was capable of consistently holding either a shallow (near the surface) depth or depths up to and in excess of 75 feet, as well as selected intermediate depths.

Although there are at least four different planing devices currently marketed which are advertised as being capable of providing depth control, none has been found to be adjustable to reasonably accurate specific depths by means other than the amount of line used as the towing line.

Some so called "deep running plugs" are advertised as being capable of trolling depths of 25 feet, and will do so with reasonable accuracy. However, to obtain deeper depths it is necessary to apply varying amounts of weight as sinkers. Additionally, when it is desirable, for example, that a depth of only 10 to 15 feet be maintained, the fisherman is usually restricted to letting out only a small amount of line. Thus, the trolling must be accomplished relatively near to the towing boat. Since fish are highly subject to being "spooked" by boat and motor noises, this restriction is highly undesirable.

When it is desired to troll in regions where the fish are running near the bottom, excessive amounts of weight are generally used and no control is usually possible to keep the tackle from settling to the bottom. There it encounters weeds, rocks and the like, is snagged and subjected to the loss of expensive gear. This sometimes happens within a few minutes after trolling activities are initiated. Thus, sport fishermen often suffer excessive expense due to the loss of their tackle.

It has also been found that prior art devices tend to trip (turn over) easily and rise to the surface without being readily reversible to again seek the desired level. When fish are caught with the use of many leveler devices, excessive difficulty is often encountered in pulling the fish to the surface. This results directly from the hydro-dynamic characteristics of the leveling device. Such devices have also been found to be undesirably insensitive to the feel of a fish hitting the tackle. They are additionally impracticable to use in casting procedures.

Attempts to solve these problems with prior art devices have been made with equipment such as that described in patents such as U.S. Pat. Nos. 3,543,431 and 2,843,966, but with minor success only.

Therefore, a primary objective of this invention is to provide a trolling depth controller which substantially overcomes the problems mentioned.

More particularly, objects of this invention include the provision of a trolling depth controller, sometimes referred to as a lure and bait leveler, which is capable of maintaining sustantially consistent levels of depth when matched with other jointly used equipment, line lengths and weights, and the trolling speed; providing a depth controller having means of attachment whereby the depth settings can be established and maintained relatively consistently from shallow to deep depths. Other objects of invention include the provision of a depth controller designed hydro-dynamically for maximized control irrespective of the towing characteristics and capable of efficient operation during casting procedures.

BRIEF DESCRIPTION OF THE INVENTION

The invention generally comprises a body portion shaped with a delta wing planform, but with reverse camber such that the lift forces generated during towing or trolling procedures provide a downward, rather than an upward, lifting force. The body is provided with a weight at or near its leading edge to supply a generally downward pitching moment. Upper and a lower rearwardly sloped fins extend normal to the body. The upper fin includes a plurality of holes along its leading edge for towing line attachment and the lower fin has similar holes therethrough, at least some of which are positioned along its trailing edge, for towed line attachment. The body includes an upward or positive dihedral (defined as an upward inclination of the wings toward the tips) in its rearward or "wing" region for stability control.

These and other features capable of meeting the objects of invention recited above will be recognized upon examination of the following specification and claims, considered in light of the attached drawings, wherein:

DETAILED DESCRIPTION OF THE DRAWINGS

Figure 1:
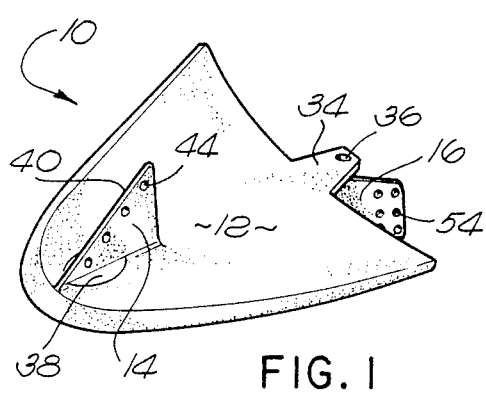
FIG. 1 is a perspective view of the trolling depth controller of this invention, illustrating its primary features.

Referring now to the drawings in detail, the depth controller of this invention is indicated generally throughout the drawings by the numeral 10. In general it includes a body or wing portion 12, an upper, rearwardly sloped fin 14 and a lower, rearwardly sloped fin 16.

Figure 2:
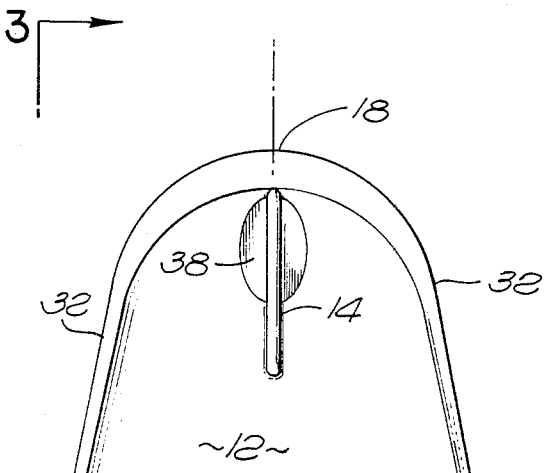
FIG. 2 is a top or plan view of the invention.

The body 12 has a planform in the general shape of a delta wing, as best illustrated in FIG. 2. Although this shape is not mandatory, it includes a nose portion 18, which is usually rounded, and a trailing edge 20, tapering modestly rearward from the center line 22 to the wing tips 24.

Unique to this device is the fact that the foil profile includes a primary cambered surface 26 on the lower side rather than on the upper side, as is normally required on airfoils and hydrofoils. An upper surface 28 is usually provided with a less pronounced, more shallow camber, as indicated by the numeral 19. It is not mandatory that this surface include any camber at all, i.e., it is sometimes flat or even concave. The design may vary, depending upon the specific characteristics required. Thus, with such a general configuration, any movement of the body through the water in the direction of the arrow 30 will result in the generation of a force or reaction causing the body 12 to sink, rather than to lift. The hydrodynamic characteristics of the foil profile cause an effect exactly opposite that of a standard hydrofoil or airfoil section. This is one of the structural characteristics which provides this depth controller with an ability to seek a lower level in the water as it is towed therethrough.

The leading edges 32 of the body, or wing 12 slope rapidly outward from the nose 18 as the wing tips 24 are approached, defining the delta shape. A tab 34 having a hole 36 therethrough is provided centrally of the trailing edge 20 for towed line attachment when certain characteristics to be described are desired.

Figure 4:
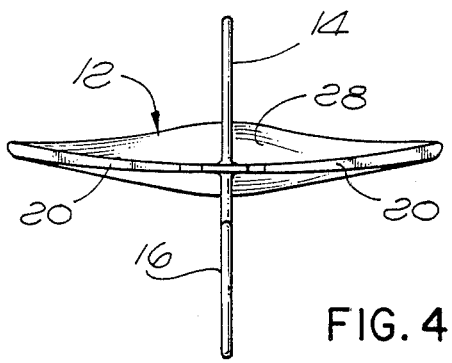
FIG. 4 is a rear elevational view, taken along line 4—4 of FIG. 3.

As will be best observed in FIG. 4, the wing-like body 12 is provided with a positive dihedral from its center line 22 to its outer extremities, i.e., wing tips 24. This being so, the upper surface 28 of the wing 12 is somewhat "dished", or more concave than it might otherwise be. This dihedral provides to the device a lateral stability which materially enhances its ability to resist being flipped into a reverse vertical orientation unless and until acted upon by an outside force such as, for example, a fish strike or a snag. It is of particular assistance in maintaining such stability during turning maneuvers, when the wing is oriented in a rolling mode. Similarly, it aids in righting the vertical orientation of the controller when it has been caused to flip to a reverse orientation by an outside force.

A lead weight 38 is incorporated in the body near the nose 18 within the streamlined contour of the body, avoiding the introduction of drag by protuberances. This extra weight introduces a negative or downward pitching moment, thereby resisting tendencies of the device to rise to the surface by virtue of the pull of the towing line, buoyancy of the material from which the device is fabricated, or other factors. The positioning of this weight in the nose region also assists in maintaining and reorienting the controller in an upright position. This results from the nose-down attitude which it naturally introduces in conjunction with the rolling motion induced when the towing and towed lines apply their respective force moments into the controller, when attached as described below.

It has been found that when a controller approximately three to four inches in length is used, a lead weight of between one-fourth and one-half an ounce is satisfactory for this purpose. A weight of approximately three-eighths of an ounce is approximately optimum. In the usual case, the weight is located rearward of the nose 18 under the upper fin 14, substantially as illustrated in FIG. 1.

In the usual case the device 10 is fabricated from a plastic material such as polypropylene in an injection molded procedure, or it is cast from aluminum or a similar light weight, high strength material. Thus, an integrated, easily manufactured unit may be provided, with the lead weight 38 integrally molded directly into the body for positive retention.

The upper fin 14 has a leading edge 40 sloped generally rearward, preferably at an angle approximately 30° from the cord line of the wing 12, and within a range of approximately 25° and 45°. It originates slightly rearward of the leading edge of the nose 18 and has a reentrant trailing edge 42, usually approaching the body surface 28 at approximately 90° with respect thereto. Towing line attachment and adjustment means in this fin comprise a plurality of holes along the leading edge 40 of the upper fin 14, as illustrated at 46 in FIG. 3. Four of such holes have been found to be optimum in a device of approximately 3 to 4 inches in length. Obviously, the number of holes may be varied as desired by the designer. A standard swivel member may be used in the holes for line attachment. The higher on the fin the line is attached, the greater the force applied to revolve the controller into a nose down attitude and the lower level the controller will seek.

The lower fin 16 extends from the lower surface 26 of the body 12 and slopes rapidly rearward at an acute angle, usually terminating at a position rearward of the wing tips 24. Its leading edge 48 tapers more pronouncedly than does the leading edge 40 of the upper fin 14, usually at an angle approximately 30° from the chord line of the body 12. This angle may vary to reasonable extent without departing from the inventive characteristics of the device.

Figure 5:
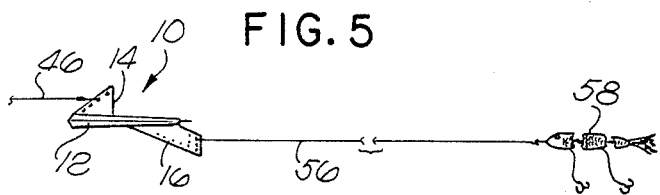
FIG. 5 is a side elevational view similar to FIG. 3 showing the controller connected in a tolling line and towing an artificial lure.

An upper edge 50 of the fin 16 is usually parallel to the leading edge 48, both such edges terminating at a trailing edge 52 oriented substantially normal to the body surface from which it extends. Similar to the upper fin 14, the lower fin 16 includes towed line 56 attachment and adjustment means in the form of a plurality of line attachment holes 54, which leads to a plug, bait, or the like 58 (FIG. 5). The purpose of having the trailing edge holes 54 located rearwardly of the device is to provide a force moment of optimum magnitude for controlling the angle of attack of the body 12. Other holes 55 may be provided at various locations within the fin for more precise control by permitting a greater variety of locations for line attachment and pitch adjustment.

Figure 3:
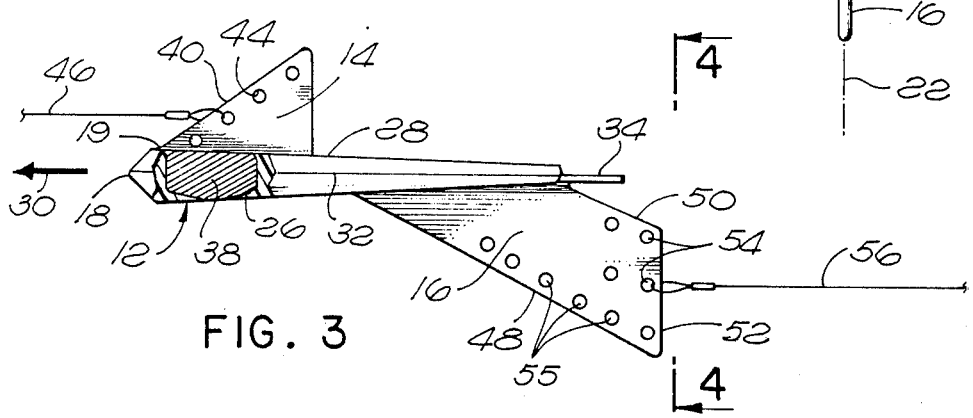
FIG. 3 is a side view taken along line 3—3 of FIG. 2.

Operationally, when it is desired that the depth controller and, therefore, the line and the bait or lure which it tows, is to be maintained at a particular depth, the line attachments to the upper and lower fins are selected in accordance with the depth desired. The towing line 46 may be connected through any one of the holes 44 in the upper fin 14. In this instance it is shown attached through the lowest hole. The towed line 56, with its lure 58 attached thereto, is shown attached through the central hole 54 in the lower fin 16, as illustrated in FIG. 3, although it could be just as readily attached through any of the other holes 54 or 55. The tackle described is then lowered or cast into the water and towed therethrough. As the towing proceeds, the nose of the controller pitches downward, as controlled by a combination of the described factors, i.e., the lead weight, the camber and the force moments acting upon the device by virtue of the positional attachments of the lines 46 and 56 through the holes 44 and 54 or 55 respectively.

It will be noted that were the line 46 attached through the second hole 44, rather than through the first one, a greater downward pitching moment and angle of attack would result; this by virtue of the fact that it is positioned higher and more rearward than is the first hole. Thus, the final result would be a tendency for the device to seek a lower depth before leveling off, carrying the bait with it. Similarly, where the line 56 to be attached through the lowest rather than the central hole 54 in the lower fin 16, as illustrated, an even greater pitching moment would be introduced, sending the device to a still greater depth.

It will be recognized that through various combinations of line attachments a great variety of depth settings can be achieved. Observations have indicated, in general, that levels of five to eight feet of depth increments can be obtained in a reasonably controlled fashion through these procedures when approximately 100 feet of towed line 46 is out and the device is being towed at a speed of about one or two knots, and with a fishing line of six to eight pound test.

When the towed line is engaged in the lowest hole 44 in the upper fin 14 and the towed line is placed in the hole 36 in the tab 34 it has been found that the lure or bait towed by this leveler will be held at or near the top of the water surface, i.e., about two to six feet under the surface. By moving the towed lure line to one of the other holes 54 or 55 in the fin 16 the running depth of the controller is increased or decreased accordingly. By also moving the towed line 46 to the second hole 44 in the fin 14 the trolling depth is further increased. This procedure can be continued or varied until a maximum depth or a desired intermediate depth is reached, depending to some extent upon the amount of line let out. It has been found that this leveler can readily reach depths of from 65 to 75 feet when line lengths of 150 to 170 feet are used.

It will be recognized that the foregoing figures are rough approximations only and that the fisherman will be required to make his own depth determinations, depending upon the various parameters of the equipment being used and the speed at which the trolling is being accomplished. However, sufficient adjustment capability is provided that, with a little experience, the controller can be expeditiously brought to a running position at essentially any depth level desired by the fisherman.

It is significant to note that when a fish strikes the towed lure, or when the lure engages a snag, the depth leveler tends to immediately flip to a vertically reversed position. This results from the forces introduced from the forward pull along the line 46 and the rearward pull along the line 54. Once so slipped or reversed, the leveler acts in the same manner as does the wing of an aircraft, causing the upward movement of the device by virtue of its hydrodynamic characteristics. Thus, it tends to be surface-seeking, thereby materially reducing the force requiring to bring the fish to the surface or, at the very least, not increasing the drag, as has been found to be characteristic of many prior art devices. It also aids in avoiding a tendency for the line to become tangled with weeds, tree trunks, etc. If it is found that the device has flipped to an upwardly directed orientation, as by virtue of having hit a snag, this lifting tendency can be overcome by the simple expedient of bringing the fishing pole rapidly rearward so as to release the forward movement tendency and then slacking the line. As soon as the towing forces are so released the weight, the hydrodynamic characteristics of the device and the dihedral in the wing will again flip the device into its upright orientation (fin 14 pointed upward). Pulling forward on the line so as to reintroduce a towing force will again cause the controller/leveler to dive back to its predetermined running level.

Procedurally, during trolling, it has been found that the amount of fishing line out can be visibly controlled by carefully placing the controller in the water upside down, i.e., with the fin 14 pointed downward, and then paying out the line. The controller remains visibly atop the water until a desired amount of line is out. The fishing pole is then brought quickly backward, permitting the controller to turn to the upright position. When so oriented, it immediately dives to the depth of setting and runs at that depth until acted upon by a fish, a snag, or some other outside force.

It will also be recognized that controllers of different sizes may be required to obtain varying characteristics, depending upon the depth desired and the size of the fish being sought. For example, it will be desirable to utilize a larger controller when fishing for large fish such as salmon or albacore.

Through the utilization of the aforedescribed controller/leveler device with its many features and characteristics of technical significance, while maintaining great structural simplicity, each of the objectives and advantages mentioned can be readily achieved. It will also be recognized that certain departures from the specifics of the foregoing description can be accommodated without departing from the inventive concepts of this unique device.

I claim:

1. A trolling depth controller which comprises:

a body having generally the shape of a delta wing, said body having upper and lower sides, a nose portion, leading edges extending away from said nose portion and connecting said upper and lower sides and a trailing edge extending between said leading edges and connecting said upper and lower sides, said lower side having a lower convex surface extending generally between said nose portion, said leading edges and said trailing edge, said troller having an upper vane extending upwardly from said upper surface, said upper vane being located adjacent to and extending rearwardly from said nose portion and being spaced equally from said leading edges of said body and said upper vane having a rearwardly sloped leading edge and a trailing edge, said body also including a lower vane extending downwardly from said lower surface, said lower vane being located adjacent to said trailing edge and having a leading edge which slopes rearwardly from said lower convex surface and including a trailing edge located to the rear of said trailing edge of said body, said lower vane being located midway between said leading edges of said body, said body also including a weight centrally located in said nose portion of said body, first line attachment and adjustment means for attaching a towing line to various fixed locations along a front portion of said upper vane located on said upper vane, other line attachment and adjustment means for attaching a towed line to various locations along a rear portion of said lower vane located on said lower vane, wherein a drag on said towed line will cause said depth controller to flip to a vertically reversed position, said body and said vanes comprising a one piece structure.

2. A trolling depth indicator as claimed in claim 1 wherein:
   said first line attachment and adjustment means comprises a series of holes spaced from one another located in said upper vane adjacent to and along said leading edge of said upper vane.
3. A trolling depth indicator as claimed in claim 2 wherein:
   said other line attachment and adjust means comprises a plurality of holes located in said lower vane.
4. A trolling depth indicator as claimed in claim 1 wherein:
   said nose portion has a rounded leading edge leading between said leading edges of said body,
   said first line attachment and adjustment means comprises a series of holes spaced from one another located in said upper vane adjacent to and along said leading edge of said upper vane,
   said other line attachment and adjustment means comprises a plurality of holes located in said lower vane.

* * * * *